Nov. 29, 1960 W. RÖSLER 2,962,059
WIRE NET MAKING MACHINE FOR SIMULTANEOUSLY
MAKING SEVERAL WIRE NETS FROM UNILATERALLY
CROSSING LONGITUDINAL WIRE WEBS, ETC.
Filed May 27, 1957 7 Sheets-Sheet 1

Fig. 1

Inventor:

2,962,059
WIRE NET MAKING MACHINE FOR SIMULTANEOUSLY MAKING SEVERAL WIRE NETS FROM UNILATERALLY CROSSING LONGITUDINAL WIRE WEBS, ETC.

Walter Rösler, Soest Opmunderweg 14, Soest, Germany

Filed May 27, 1957, Ser. No. 661,968

Claims priority, application Germany Jan. 18, 1957

16 Claims. (Cl. 140—112)

The simultaneous making of several wire nets from unilaterally crossing longitudinal wire webs and transverse wires which are successively applied to the longitudinal wire webs and welded thereto in positions corresponding to their positions in the finished nets, is already known. According to one such suggestion the procedures is such, e.g., that a hoselike network is made first, which is subsequently cut open at one or several points to obtain the desired number of nets.

Another proposal of that kind resides in that a roller carrier is thrown fore and back under the influence of kinetic enregy imparted to it by beating mechanisms and applies several transverse wires simultaneously to several longitudinal wire webs in zig-zag shape while the latter are being moved. Each length of transverse wire which has been applied is then welded to the longitudinal wire webs while the same are at a standstill. This enables the making of nets of relatively small width in an economical manner because the roller carriers may be operated at very high speeds and several nets are obtained at the same time whereas no cutting or separating operations are required. For wider nets, however, the dimensions of such wire net making machines become very considerable so that the problem of making wide and very wide nets simultaneously has not yet been satisfactorily solved in this manner.

Based on the making of several wire nets from unilaterally crossing longitudinal wire webs and transverse wires which are successively applied to the longitudinal wire webs and welded thereto in positions corresponding to their positions in the finished nets, the invention has as its object to make nets which have inherently the desired form of mesh, particularly of square or rectangular or any other desired configuration, and which can also be made simultaneously in any desired number and in any, even large widths. It is another object of the present invention that the size of the meshes themselves can be varied at any time in the same machine without major alterations thereof, only by a readjustment of parts.

Wire net making machines serving to achieve that object are characterized by several welding electrode bridges the lengths of which correspond relatively to the widths of the longitudinal wire webs extending therethrough and which are related to each other so that their longitudinal centre lines define a polygon, in conjunction with means for continuously apply a transverse wire or several transverse wires to the longitudinal wire webs which are intermittently moved towards the polygon and for laying the transverse wire or the transverse wires in positions which coincide with the centre lines of the electrode bridges, further in conjunction with severing means which are disposed between the electrode bridges and sever a transverse wire length which has just been welded from the previously welded transverse wire length. The construction of said wire making machine will be the more compact the closer the several welding electrode bridges are arranged to each other so that the welding electrode bridges form practically the polygon themselves. Stationary stops consisting, e.g., of cylindrical pins, for engaging the transverse wire or transverse wires are arranged at the ends of the welding electrode bridges in such a manner that tangents to the cylinders on the outside thereof coincide with the centre lines of the electrode bridges. If the centre lines of the welding electrodes define a regular polygon the entire machine may be designed with central symmetry. To this end the means for applying the transverse wire or transverse wires to the longitudinal wire webs and for laying this transverse wire or transverse wires in positions coinciding with the centre lines of the electrode bridges comprise, in addition to stationary stops leading to said bridges, transverse wire guides moving on a closed path surrounding the electrode bridges. A common, preferably circular path will preferably be provided for all transverse wire guides. This is suitably effected by arranging the transverse wire guides on a turret, which may be driven by a central gear arranged preferably in said axis of symmetry of the polyon and having a kingshaft from which the drive of the product rolls pulling off the finished net lengths is kinematically derived. In this connection it is suitable to insert friction gears, such as slip couplings, in the drive of these product rolls, in order to compensate leads or lags which may always occur in such a complicated machine. If the turret is also designed to carry the transverse wire reel the difficulties will be eliminated which are involved in stationary reels because the transverse wire would have to rotate about itself to prevent unnecessary stresses being exerted on the transverse wire due to the twisting of the transverse wire resulting from the laying thereof. The severing means which ensure that the transverse wire which has been laid will remain integral with the transverse wire coming from the transverse wire guide only as long as it has not been welded, i.e. during the laying and welding thereof, are suitably designed so that a movable beam of a welding electrode bridge carries a severing knife, which is arranged only on that side of the beam which faces the arriving transverse wire. The knife is desirably arranged so that the knife becomes effective only just after a transverse wire length has been welded to the longitudinal wire web by that beam. If this involves the formation of projecting transverse wire ends it is desirable to provide additional, suitably stationary but rotating knives for severing the projecting transverse wire ends before the finished net is pulled off and wound up by the product roll.

The usual filling and warp stop motions ensure that the necessary number of longitudinal wires will always be provided and the longitudinal wires will have the correct position and tension. The filling stop motions will preferably consist of the above-mentioned stops consisting of cylindrical pins, because here it becomes first apparent whether a transverse wire arrives and is laid in a proper manner. To this end the pins may be resiliently arranged to close electrical contacts and with them a circuit when engaged by the transverse wire, which is under a certain initial tension. A relay included in that circuit will automatically arrest the machine as soon as the transverse wire does no longer engage the pin properly or does not engage it at all. Breakage of a longitudinal wire will actuate the above-mentioned warp stop motions to arrest the machine.

It is a further object of the invention to construct the wire net making machine so that the maximum output can be achieved, which is most strongly required in mass production. Whereas the longitudinal wires are only very slightly stressed owing to their relatively small feed between two transverse wires, the opposite is the case with the transverse wires. During the relatively short periods of time available for laying the transverse wires these are pulled off at very high speeds so that correspondingly high accelerations result; the pulling movement does not take place along a straight line but more or less along a curve, depending on the specific conditions. For this reason the transverse wires are subjected to extremely high instantaneous tensile forces, which they cannot always withstand so that wire breakage results. When such a wire breakage occurs in machines equipped with central gears, which are required for carrying out the process proposed hereinbefore, as will be explained hereinafter, the resulting defect in the network may not be readily repairable by turning the machine back because the central gear is positively kinematically connected to all moved machine parts. Above all, however, the entire machine must be arrested even if only a single transverse wire breaks. This means that the loss of production suffered by the machine is the greater the more nets are being made thereon, at the same time.

Therefore, in a development of the invention wire net making machines comprising welding electrode bridges defining a polygon, means for continuously applying a transverse wire to longitudinal wire webs moved towards the sides of the polygon, and transverse wire severing means, which machines continue their operation also in the case of transverse wire breakage, though at a reduced output, are characterized in that, on the one hand, each of the self-contained units for producing the electrode stroke, the action of the welding current, the severing of the transverse wire and the pulling of the longitudinal wires is provided with a separate drive, whereas, on the other hand, these component machines have a common transverse wire feeding device. The desired intermittent sequence of operation will then be obtained if an intermittently operating clutch is arranged in each component machine between the drive and the means for producing the electrode lift, the action of the welding current, the severing of the transverse wire and the pulling of the longitudinal wires. For the same purpose feelers are arranged, particularly in the corners of the polygon, which feelers determine suitably the position of the transverse wires in the welding position and are so included in circuits which control the clutches of the component machines that the component machine controlled by such a feeler will be in operation when a transverse wire under the feed tension engages such a feeler and that the component machine will be out of operation as soon as the contact between the feeler and the transverse wire has been discontinued, as will be the case, e.g., when a transverse wire has broken. In that case the component machine in which that transverse wire is about to be applied and welded to a longitudinal wire web the making of the net to be made therein will be discontinued for a single working stroke, i.e. until the next transverse wire is applied. As a result the component machines continue their operation without breakdown and the production is not interrupted.

The common transverse wire feed means consists preferably of a continuously revolving striplike carrier for the supply of transverse wire, which carrier is closed in the form of a ring surrounding the component machines and is preferably arranged on the level of the welding electrode bridges. Each of the component machines may comprise separate racks for the supplies of longitudinal wires, which are preferably provided in the form of spools. It may also comprise separate transformers. The spool racks are desirably arranged to lie above the striplike carrier for the transverse wire spools and define a section of a truncated pyramid so that they are readily accessible and can be attended from the outside.

The drawing shows two kinds of wire net making machines, which are constructed so that according to both embodiments converging longitudinal wire webs have applied and continuously welded thereto at least one continuously fed transverse wire which crosses the same and lies on one side thereof, each welded transverse wire length is severed from a previously welded transverse wire length, then the net thus formed is pulled with the longitudinal wires which have served to make the same, and the operations of applying, welding and severing the transverse wire and pulling the produced net lengths are performed for the other longitudinal wire webs in that cyclic interchange of operations which results from the disagreement between the number of longitudinal wire webs and the number of transverse wires.

Figure 1:
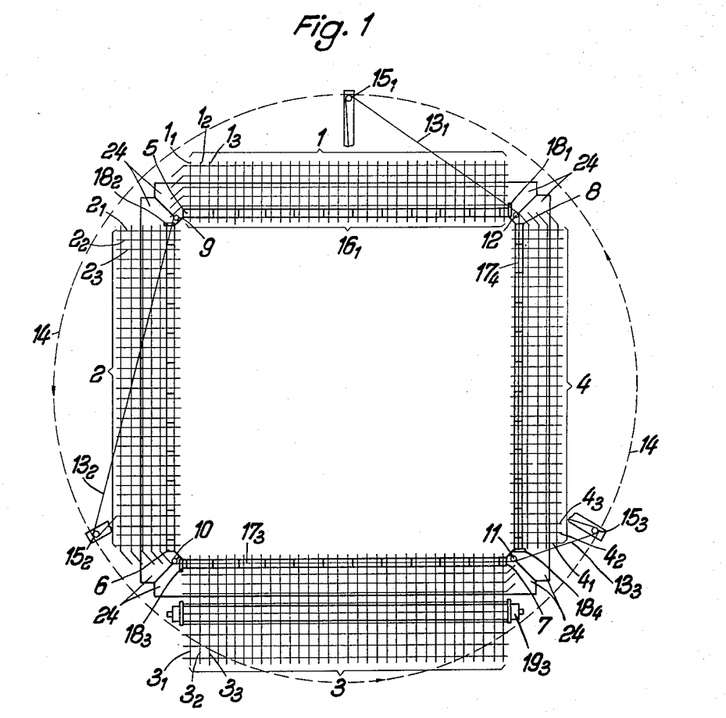
Fig. 1 is a top plan view showing a machine for simultaneously making four nets according to the first basic process. The plan view shows the four longitudinal wire webs and the guides for the three transverse wires used to make these four nets. Of the other parts of the machine only those are shown which are most essential, in order to simplify the representation.

In Fig. 1 of Figs. 1 to 3, which illustrate the first embodiment of a wire net making machine, four longitudinal wire webs 1, 2, 3, 4 are shown, each of which consists of several longitudinal wires $1_1$, $1_2$, $1_3$ etc., $2_1$, $2_2$, $2_3$ etc., $3_1$, $3_2$, $3_3$ etc., $4_1$, $4_2$, $4_3$ etc. These longitudinal wire webs lie in one plane and are intermittently moved. They converge in their directions of movement so that they would intersect unless the formation and pulling of the net was effected before. To this end the welding electrode bridges 5, 6, 7, 8, which will be described more fully hereinafter and are diagrammatically shown in Fig. 1, are disposed in the path of said longitudinal wire webs. Stops 9, 10, 11, 12, in the form of cylindrical pins are arranged between said electrode bridges so that tangents applied to their periphery on the outside thereof coincide exactly with the centre lines of the electrode bridges 5 to 8. To make four wire nets, three transverse wires $13_1$, $13_2$ and $13_3$ are successively applied to said longitudinal wire webs. These transverse wires are fed via transverse wire guides $15_1$, $15_2$ and $15_3$, which revolve on a common circular path 14. The guide $15_1$ is disposed just at the centre of the net $16_1$ to be made from the longitudinal wire web 1. If the previously welded transverse wire lengths are designated 17, a previously welded transverse wire length $17_4$ is provided. This transverse wire length $17_4$ has already been severed from the transverse wire length $17_3$ with the aid of the knife arrangement $18_4$, which was operated immediately after the transverse wire length $17_4$ had been welded to the longitudinal wire web 4. As a result the transverse wire $13_1$ which has just been laid by the transverse wire guide $15_1$ is already fixed at $17_4$ so that the stop 12 in conjunction with the movement of the transverse wire guide $15_1$ must cause the transverse wire $13_1$ to assume a tangential position relative to the stops 9, 12. This means that after the revolving transverse wire guide $15_1$ has arrived at the left-hand end of the electrode bridge 5 the transverse wire $13_1$ will lie exactly in the centre line of said bridge so that the lifting movement of the movable beam of the electrode bridge and the application of the welding current will cause for the welding of the transverse wire length $13_1$ to the longitudinal wire web 1 and the making of the net $16_1$ with the transverse wire length $13_1$ in the correct position. The lifting movement of the movable beams may be brought about by cam-actuated draw rods. Such an arrangement may be similar to that shown in the apparatus illustrated in Figs. 4–7 (to be described below), except that the cam-actuated draw rod mechanism produces a vertical movement of the beams, as opposed to the horizontal movement utilized in the apparatus to be described below. Suitable electronic control devices of known construction may be used to synchronize the flow of welding current with the movement of the electrode bridges. Such an arrangement is shown, in part, in Fig. 8 (to be described below). For the transverse wire $13_2$ the laying operation has almost been completed when the transverse wire guide $15_2$ is in the position shown in the drawing. The transverse wire length $17_3$ has already been welded to the longitudinal wire web 3 and has been severed by the knife arrangement $18_3$ from the foregoing transverse wire length $17_2$, which is no longer visible because it has already been wound up with the finished net. The transverse wire guide $15_3$ is just laying a transverse wire length with the aid of the stops 11, 12. This is possible because the transverse wire length $17_3$ has already been welded to the longitudinal wire web 3 to provide a fixed point, which enables the application of the transverse wire length $13_3$ to the stops 11, 12. The operations described are repeated in a cyclic interchange so that one of the laying, welding severing and pulling operations is performed on each of the four longitudinal wire webs. The finished net is drawn onto a storage roll 19, the roll associated with the net 3 being indicated schematically in Fig. 1 at $19_3$.

Figure 2:
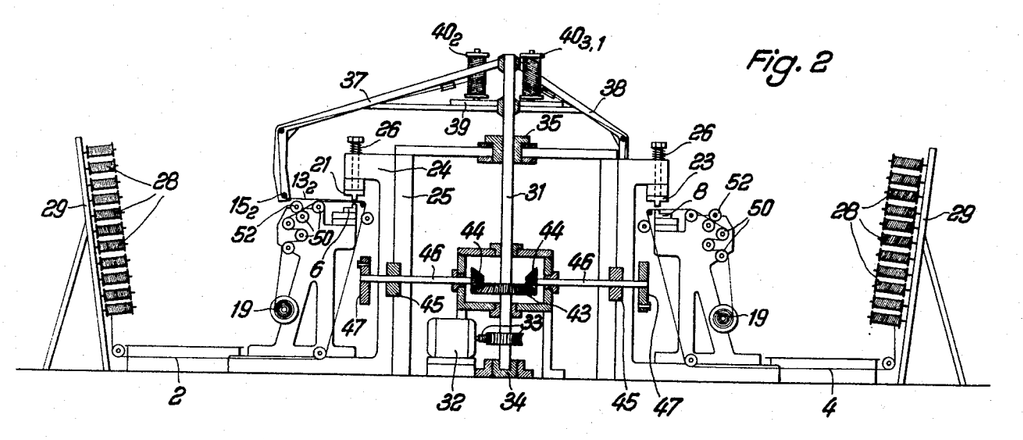
Fig. 2 is an elevation showing the machine also only in a diagrammatic view in order to enable emphasis being laid on the most essential parts.
Figure 3:
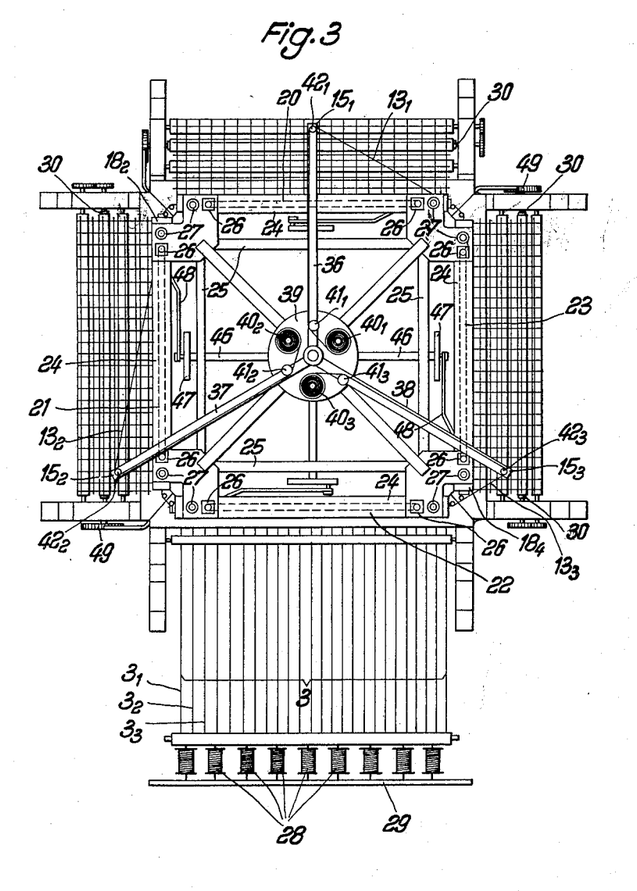
Fig. 3 is a top plan view of the machine of Fig. 2.

Figs. 2 and 3 show the further construction of a wire net making machine, the basic mode of operation of which has been illustrated with reference to Fig. 1.

Fig. 2 shows first the construction of the electrode bridges, of which the electrode bridges 6, 8 are visible. The electrode bridge 5 would also be apparent in the top plan view. In order to avoid impairing the legibility of the drawing that top plan view has not been shown. The fixed electrode bridge beams 6, 8 shown in Fig. 2 have movable electrode bridge beams associated therewith; of these, 21 and 23 are visible in Fig. 2 whereas the movable electrode bridge beams 20 and 22 have been indicated in Fig. 3. The drive elements of these movable electrode bridge beams 20—23 are disposed in and on the head members 24 of the base frame 25 of the machine. Return springs 26 serve to cushion the upper electrode bridge beams 20 to 23 to provide for resilient contact pieces during welding. Drive means of any kind, e.g. hydraulically actuated plungers 27 operated at a high frequency may be provided to effect the actual welding stroke. As is shown for the longitudinal wire webs 2 and 4 in Fig. 2 and for the longitudinal wire web 3 in Fig. 3 the longitudinal wire webs lead to longitudinal wire reels 28, which are arranged in the spool racks 29 laterally of the machine.

The knife arrangements $18_1$, $18_2$, $18_3$, $18_4$, which have already been mentioned in connection with Fig. 1 and are also indicated in Fig. 3, are movable together with the electrode bridge beams 20—23. This arrangement is seen to result in short projecting ends of transverse wire, which are eliminated by circular knives 30.

A kingshaft 31 is driven by the motor 32 by means of the worm gear 33. The kingshaft is carried in bearings at 34 and 35 and carries a turret head having three jib arms 36, 37 and 38, at the ends of which the transverse wire guides $15_1$, $15_2$ and $15_3$ are disposed, which have already been mentioned in Fig. 1. The transverse wires have also been shown in Figs. 2 and 3, and have again been designated with $13_1$, $13_2$, $13_3$. The turret head carries at 39 a baseplate, on which the three transverse wire reels $40_1$, $40_2$ and $40_3$ are arranged. The transverse wires are guided by means of guide rollers $41_1$, $41_2$ and $41_3$ as well as $42_1$, $42_2$ and $42_3$ to the fixed points determined by the stop 12 for the transverse wire $13_1$, the stop 9 for the transverse wire $13_2$ and by the stop 11 for the transverse wire $13_3$. No transverse wire guide is associated with the stop 10 because that stop belongs to a transverse wire length $17_3$ which has already been laid, welded and severed at $18_3$.

Finally the pulling means for the finished nets are visible. To this end the kingshaft 31 carries a bevel wheel 43 in mesh with the pinions 44. The shafts 46 which are thus driven are carried in bearings 45 in the machine frame 25 and carry eccentric discs 47, which effect the feed movement of the finished wire nets in the longitudinal direction by means of push rods 48, back gears 49 and guide rolls 50. Being driven by a friction drive the product rolls 51 wind up the finished wire nets. A knife shaft 52 with the circular shears 30 eliminates the projecting ends of transverse wire.

The considerable advantage of the proposed machine resides in the first place in that the possibility of arranging any desired number of welding electrode bridges, in the illustrative embodiment of four such bridges, and the feeding of any desired number of transverse wires, in the present case of three such wires, enables the utilization of the standstill required in the pulling of the longitudinal wires and in the feeding of the finished net to perform a welding operation for performing the required operations such as the feeding of the longitudinal wire webs, the pulling of the finished net lengths and the laying of the transverse wire with all other welding electrode bridges. This results in a previously unachieved welding output because the process of operation and the machine may be arranged so that at any given instant one of the electrode bridges carries out a welding operation.

The stops 9 to 12 may be designed as transverse wire stop motions if they are resiliently arranged. In that case the application of a transverse wire which is always under a certain initial tension to the stops will cause the latter to close an electric contact and with it a circuit. The machine will be automatically shut down by means of a relay as soon as the stop and transverse wire stop motion moves from the position which results from the engagement of the transverse wire to the position which results from the action of the spring forces now released. Moreover, longitudinal wire stop motions (not shown) are provided for arresting the machine as soon as a longitudinal wire has broken.

Figure 4:
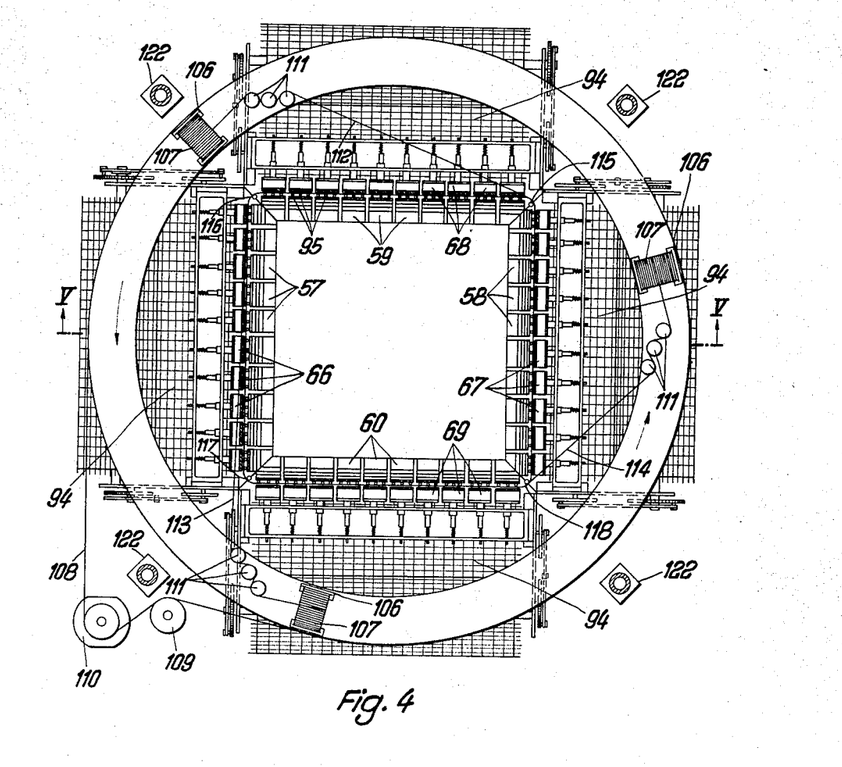
Fig. 4 is a top plan view of a machine which serves for carrying out the second basic process, taken on a level which is slightly above the striplike carrier for the transverse wire spools, which carrier is common to all component machines.
Figure 5:
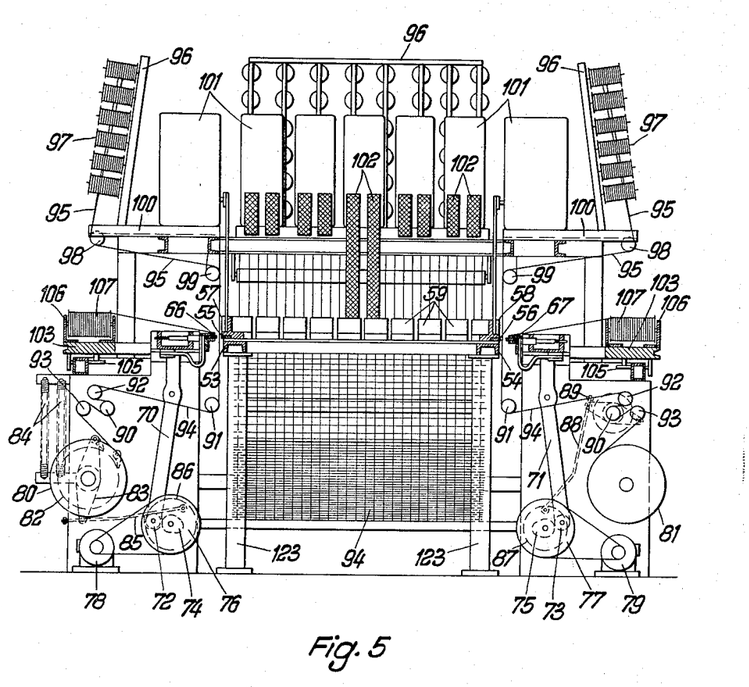
Fig. 5 is a vertical sectional view of the machine, taken along line V—V of Fig. 4.
Figure 6:
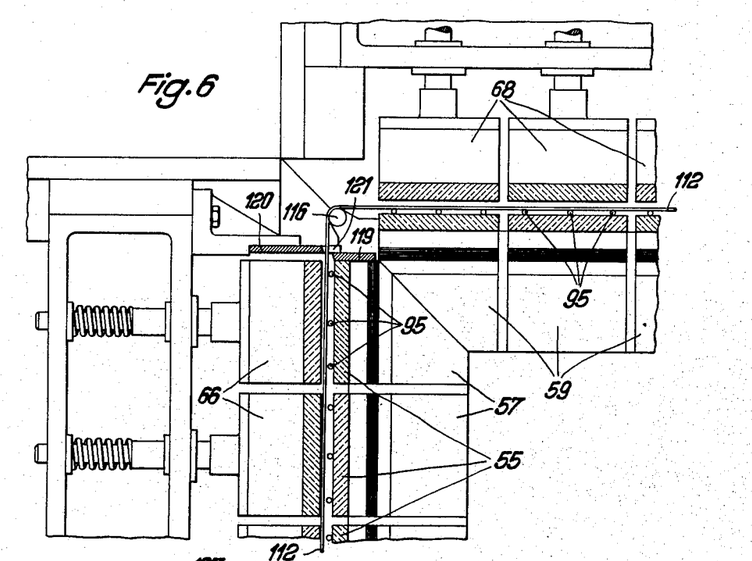
Fig. 6 is an enlarged view partial in plan and partial in horizontal section and showing the joint between two component machines.

Representing the second illustrative embodiment of a wire net making machine, which is designed for carrying out the second basic process, Figs. 4 to 7 show the wire net making machine to consist of four component machines having separate welding means and means for producing the electrode stroke, the action of the welding current, the severing of the transverse wire and the pulling of the longitudinal wires. In Fig. 5 the welding electrode bridges 53, 54 are apparent, which define a square polygon and serve to carry the individual electrodes 57, 58 carrying the fixed welding electrodes 55, 56. As is shown in Fig. 4, the individual electrodes 57, 58 are arranged in rows so that that figure shows also the additional electrode rows 59 and 60 of the two other component machines. The movably cushioned welding electrodes 66, 67 are arranged opposite to the fixed electrodes 55, 56 in Fig. 5. These movable individual electrodes are also arranged in rows, as is apparent at 66, 67, 68 and 69 in Fig. 4. Fig. 5 shows also that the movable individual electrodes 66–69 are combined in electrode bridges. As is particularly apparent from Fig. 5 these movable electrode bridges are subjected in each of the component machines to the influence of the double-armed levers 70, 71. Corresponding double-armed levers are provided in the two other component machines. The free ends of the levers 70, 71 carry rollers 72, 73, by means of which they are controlled by the cams 74, 75. The cams 74, 75 are driven by the clutches 76, 77, whose outer parts, which constitute flywheels, are driven by the electric motors 78, 79. The clutches 76, 77 consist of rolling- or sliding-key clutches or of electric clutches, such as magnetic-powder or induction clutches. The product rolls 80, 81 serving for pulling the longitudinal wires and the net as far as it has already been completed are periodically rotated by means of the ratchet wheel 82, the locking pawl lever 83 and the coil-shaped tension springs 84. The locking pawl lever 83 is actuated by means of the drawrod 85 and the eccentric disc 86. In the right half of Fig. 5 it is seen that another eccentric disc 87 is provided, which acts by means of a drawrod 88 and a ratchet gear 89 on the transport roll 90. The eccentricities of the drawrods 85 and 88 are adjustable to enable the adjustment of different mesh widths. In addition to the transport roll 90, guide rollers 91, 92 and 93 for the finished net 94 are provided, whereas separate guide rollers 98, 99 are provided for the longitudinal wires 95 pulled from the rack 96 for the longitudinal wire spools, more particularly from these longitudinal wire spools 97 themselves. What has been described for the component machines visible in Fig. 5 applies logically to the other component machines visible in Fig. 4.

A platform 100 provided above the electrode bridge mounts the transformers 101 associated with the individual electrodes. Secondary bands 102 connect the secondaries of the transformers to the bridges for the electrode rows 57 to 60.

Figure 7:
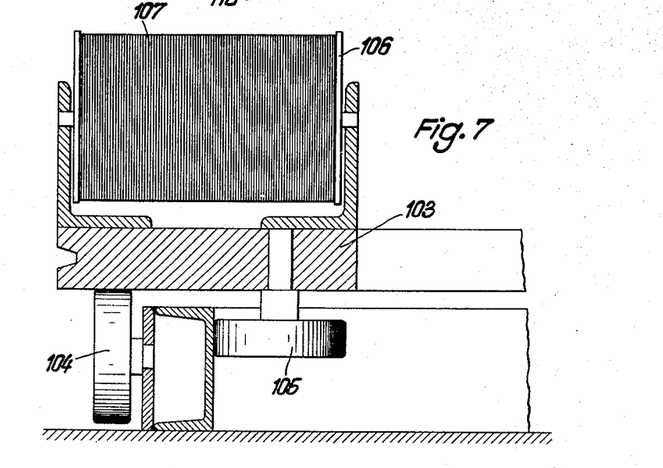
Fig. 7 is a vertical sectional view of the striplike carrier for the transverse wire spools.

The common transverse wire feeding means consists of a continuously revolving striplike carrier 103, which is closed in the form of a ring surrounding the described component machines. That carrier may consist of lightweight materials such as plywood, plastics, light alloy sections, or may be of lattice construction. As is shown in Fig. 7 the carrier 103 is provided with carrying and guide rollers 104, 105 and serves for supporting the transverse wire spools 106 carrying the supply 107 of transverse wire. The carrier is suitably driven by means of a V belt 108 (cf. Fig. 4), tension roller 109 and drive 110. When several electric motors are employed in each drive they are suitably arranged opposite to each other so that the V belts serve also for centering. The number of transverse wire spools 106, 107 differs suitably from the number of longitudinal wire webs or component machines so that a staggering of the sequences of operations in the several component machines enables the fullest possible utilization of the component machines and ensures that in the case of troublefree operation each of the component machines will just perform a welding operation when the laying of the transverse wires and the pulling of the longitudinal wires or of the finished net is performed in the other component machines so that these operations are performed in a cyclic interchange in all component machines. It is seen that the transverse wires 112, 113, 114 are pulled off at the same time by way of the straightening rollers 111 provided on the annular carrier 103. Feelers 115, 116, 117 and 118 are arranged at the corners of the polygon, which is shown particularly distinctly in Fig. 6. The latter figure, however, shows the laying of the transverse wire in a phase which follows immediately the laying phase shown in Fig. 4. The feelers 115, 116, 117 and 118 are arranged in such a manner that they determine the position of the transverse wire, in Fig. 6 of the transverse wire 112, in the welding position. These feelers are included in circuits acting on the clutches 76, 77 etc. of the component machines in such a manner that the component machine will be in operation when a transverse wire under the feed tension engages such a feeler, whereas it will be out of operation as soon as the contact of the feeler with that transverse wire has been discontinued. That arrangement of the feelers in said circuit is not shown. As a result of that arrangement the component machine provided with the rows of individual electrodes 59, 68 will be in operation when the transverse wire 112 engages the feeler 115 in Fig. 4 and the associated movable electrodes will perform their stroke immediately after the application of the transverse wire 112 to the longitudinal wire web 95 has been completed. Thus the welding current becoming effective will weld the longitudinal and transverse wires together at the crossing-points, whereby the net is formed. Immediately thereafter the net is pulled off by means of the associated product beam. In the meantime the transverse wire spool which lays the transverse wire 114 has already reached the component machine considered and has begun laying the wire as soon as the transverse wire 114 has contacted the feeler 115. The component machine considered would not have come into operation if the transverse wire 114 had been broken between the welding of the transverse wire 112 and the arrival of the spool carrier considered last. In that case the component machine considered will remain inoperative for one working stroke. The next transverse wire arriving will start the same component machine. A holding-down device not shown in the drawings compels the transverse wires, which are moved with a slight downward inclination, to move vertically to the knife 119 (Fig. 6) affixed at the input end of each electrode row. The counter-knife 120 movable with the electrode bridge has a slot 121, in which the transverse wire 112 is vertically aligned with the middle of the electrode. The distance between the cutting edges of the knives 119, 120 is determined so that the electrodes resiliently held in the movable welding electrode bridge are first subjected to the welding pressure and perform the welding operation before the knives 119, 120 have approached to cut off the transverse wire. Thus the wires will have and retain their relative position determined by the mesh width in the position of welding. The circular knives shown cut off the projecting ends of the transverse wires if a longitudinal wire is not aligned with the plane of the knives.

Columns 122 carry the platform 100. Additional columns 123 carry the welding electrode bridges 53, 54 etc.

Figure 8:
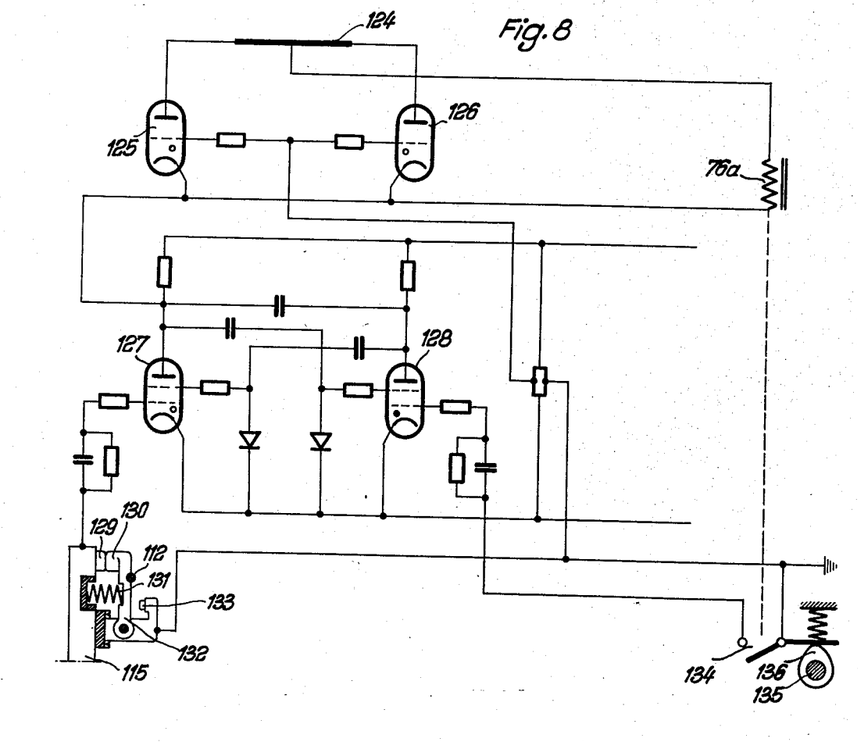
Fig. 8 shows a circuit diagram of the electronic control means for magnetic clutches, which are employed in the machine shown in Figs. 4 to 8, as well as one of the transverse wire stop motions.

Fig. 8 shows the circuit diagram of an electronic control means for magnetic clutches, to be employed if the clutches 76, 77 shown in Fig. 5 consist of magnetic clutches or magnetic-powder clutches.

124 is a transformer, to which the power tubes 125, 126 are connected. The pilot tubes are indicated at 127, 128. The control winding of the electromagnets provided in the magnetic clutches 76, 77 etc. is shown diagrammatically at 76a. One of the transverse wire stop motions 115, 116, 117 and 118 is also diagrammatically shown. The transverse wire stop motion 115 is shown in that condition in which the contacts 129, 130 are closed because the taut transverse wire 112 engages the movable arm 132 of the transverse wire stop motion, which are spring-loaded at 131. Breakage of that transverse wire will cause the arm 132 under the influence of the spring 131 to engage the buffer 133 consisting of rubber or the like so that the contact 130 is separated from the contact 129. Thus the pilot tubes 127, 128 and the power tubes 125, 126 become deenergized to cause a deenergization of the winding 76a of the magnetic clutch 76. As soon as the next transverse wire 115 reengages the arm 132 the contacts 129, 130 will be closed and the winding 76a of the magnetic clutch 76 will be reenergized. Thus only that one length of transverse wire which contains the break will not be welded whereas the next transverse wire is used again in the making of the net and is welded to the longitudinal wires. In addition to the transverse wire stop motion 115 an additional switch 134 is provided, which is under the influence of a machine shaft 135 and of a cam 136 rotating therewith. The winding 76a of the magnetic clutch 76, under the influence of the contacts 129, 130 closed when the transverse wire engages the arm 132 the winding 76a of the magnetic clutch 76 remains energized until, the elevation of the cam 136 opens the switch 134. In that case the pilot and power tubes and with them the magnetic clutch are again deenergized. The machine shaft 135 performs a full rotation during each working cycle and during that rotation causes the lifting of the electrode bridges, the closing of the circuit for the welding current and the longitudinal displacement of the finished net. What has been said of the clutch 76 applies analogously to the clutch 77 etc. of all other component machines disposed on one side of the polygon. Each of the transverse wire stop motions 115, 116, 117 and 118 is included in a circuit designed in accordance with Fig. 8.

It is in the nature of the invention that it is not exhausted by the embodiment shown. For instance, it is not necessary to arrange the transformers 44 on a platform above the welding electrodes but the transformers could also be accommodated in the several component machines. The arrangement of the spool racks 40 is also insignificant. The gears proposed for the several component machines could be replaced by gears of other construction, of course, because it is only essential that the welding electrodes perform their stroke and that the longitudinal wires and with them the net which has been formed are pulled off.

What is claimed is:

1. Machine for simultaneously producing a plurality of wire nets from longitudinal wires and transverse wires which cross each other at only one side and which points of intersections are welded, said machine comprising, in combination a plurality of welding electrode bridges arranged in the form of a polygon, each of said bridges having electrodes which electrodes work with each other, at least one of said electrodes being movable in a bridge plane between two positions, whereby a closed position is obtained by means of a spaced position of the electrodes which spaced position is relative to the thickness of the net and wherein an open position is obtained by a greater space between the electrodes, guiding means for guiding each of the longitudinal wires in a plane which extends between the electrodes through the latter, driving means for the movable electrode which can be used for bringing said electrode periodically into the closed and thus in the welding position as well as in the open position, displacing means for at least one endless transverse wire which can be used to adjust said transverse wire or all of said longitudinal wires one after the other and to extend said transverse wire in one line per longitudinal wire conduit, the course of said line being in harmony with the straight line in which a central plane of an electrode crosses the plane of the longitudinal wire which is guided through the electrodes forming said central plane, said displacing means having stop members at the angles of the polygon wherein said central plane coincides with the contact surfaces of said stop members, moving means for each of the longitudinal wires and for that part of said longitudinal wires which has already been formed into a finished net, said moving means maintaining constant the said longitudinal wire length at least in the closed position of said electrodes in the ratio to these electrodes occurs, and to move said longitudinal wire length during the other period, for obtaining the formation of meshes and the drawing off of the finished net, means for separating the length of a transverse wire which is already welded together with a longitudinal wire from the further supplied tranverse wire, and driving means for said separating means to operate the separating means when the transverse wire length following the separating point is welded together with the respective longitudinal wire conduit.

2. A machine for producing nets of wires as described in claim 1, wherein said displacing means having an arrangement for consecutively placing the endless transverse wire on the longitudinal wire lengths consecutive to the supplying direction of the transverse wire, said displacing means having associated therewith stop members adjusted to the angles of said polygon, said stop members having fitting planes for the transverse wire, a plane contacting the fitting planes of two consecutive stop members lying in the central plane of the electrode.

3. A machine for producing nets of wires as described in claim 1, wherein said displacing means having an arrangement for consecutively placing the endless transverse wire on the longitudinal wire lengths consecutive to the supplying direction of the transverse wire, said arrangement having a surrounding supplying device for the endless transverse wire, said supplying device consecutively adjusting the endless transverse wires to the longitudinal wire in a polygon surrounding the motion conduit.

4. A machine for producing nets of wires as described in claim 1, wherein said displacing means having an arrangement for consecutively placing the endless transverse wire on the longitudinal wire lengths consecutive to the supplying direction of the transverse wire, said arrangement having a surrounding supplying device for the endless transverse wire, said supplying device consecutively adjusting the endless transverse wires to the longitudinal wire in a polygon surrounding the motion conduit, said supplying device comprising a framework having a supporting shaft and supporting arms attached to said supporting shaft, guiding means at said supporting arms for the transverse wire, the supporting arms with the guiding means overlapping the parts of the longitudinal wire conduits defining a polygon, said machine for producing nets of wires further comprising driving means for said supporting shaft and supply spools for each endless transverse wire, said supply spools being adjusted at the framework.

5. Machine for simultaneously producing a plurality of wire nets from longitudinal wires and transverse wires which cross each other at only one side and which points of intersections are welded, said machine comprising, in combination a plurality of welding electrode bridges arranged in the form of a polygon, each of said bridges having electrodes which electrodes work with each other, at least one of said electrodes being movable in a bridge plane between two positions, whereby a closed position is obtained by means of a spaced position of the electrodes which spaced position is relative to the thickness of the net and wherein an open position is obtained by a greater space between the electrodes, guiding means for guiding each of the longitudinal wires in a plane which extends between the electrodes through the latter, driving means for the movable electrode which can be used for bringing said electrode periodically into the closed and thus in the welding position as well as in the open position, displacing means for at least one endless transverse wire which can be used to adjust said transverse wire or all of said longitudinal wires one after the other and to extend said transverse wire in one line per longitudinal wire conduit, the course of said line being in harmony with the straight line in which a central plane of an electrode crosses the plane of the longitudinal wire which is guided through the electrodes forming said central plane, said displacing means having stop members at the angles of the polygon wherein said central plane coincides with the contact surfaces of said stop members, moving means for each of the longitudinal wires and for that part of said longitudinal wires which has already been formed into a finished net, said moving means maintaining constant the said longitudinal wire length at least in the closed position of said electrodes in the ratio in which these electrodes occur, and to move said longitudinal wire length during the other period, for obtaining the formation of meshes and the drawing off of the finished net, means for separating the length of a transverse wire which is already welded together with a longitudinal wire from the further supplied transverse wire, and driving means for said separating means to operate the separating means when the transverse wire length following the separating point is welded together with the respective longitudinal wire conduit, said displacing means having an arrangement for consecutively placing the endless transverse wire on the longitudinal wire lengths consecutive to the supplying direction of the transverse wire, said arrangement having a surrounding supplying device for the endless transverse wire, said supplying device consecutively adjusting the endless transverse wires to the longitudinal wire in a polygon surrounding the motion conduit, said supplying device having a strap-shaped circulation carrier which surrounds the parts defining the polygon of the longitudinal wire conduits, and supply spools for transverse wires adjusted on said carrier.

6. Machine for simultaneously producing a plurality of wire nets from longitudinal wires and transverse wires which cross each other at only one side and which points of intersections are welded, said machine comprising, in combination a plurality of welding electrode bridges arranged in the form of a polygon, each of said bridges having electrodes which electrodes work with each other, at least one of said electrodes being movable in a bridge plane between two positions, whereby a closed position is obtained by means of a spaced position of the electrodes which spaced position is relative to the thickness of the net and wherein an open position is obtained by a greater space between the electrodes, guiding means for guiding each of the longitudinal wires in a plane which extends between the electrodes through the latter, driving means for the movable electrode which can be used for bringing said electrode periodically into the closed and thus in the welding position as well as in the open position, displacing means for at least one endless transverse wire which can be used to adjust said transverse wire or all of said longitudinal wires one after the other and to extend said transverse wire in one line per longitudinal wire conduit, the course of said line being in harmony with the straight line in which a central plane of an electrode crosses the plane of the longitudinal wire which is guided through the electrodes forming said central plane, said displacing means having stop members at the angles of the polygon wherein said central plane coincides with the contact surfaces of said stop members, moving means for each of the longitudinal wires and for that part of said longitudinal wires which has already been formed into a finished net, said moving means maintaining constant the said longitudinal wire length at least in the closed position of said electrodes in the ratio in which these electrodes occur, and to move said longitudinal wire length during the other period, for obtaining the formation of meshes and the drawing off of the finished net, means for separating the length of a transverse wire which is already welded together with a longitudinal wire from the further supplied transverse wire, and driving means for said separating means to operate the separating means when the transverse wire length following the separating point is welded together with the respective longitudinal wire conduit, said displacing means having an arrangement for consecutively placing the endless transverse wire on the longitudinal wire lengths consecutive to the supplying direction of the transverse wire, said displacing means having associated therewith stop members adjusted to the angles of said polygon, said stop members having fitting planes for the transverse wire, a plane contacting the fitting planes of two consecutive stop members lying in the central plane of the electrode, said stop members being formed as transverse wire control members.

7. Machine for simultaneously producing a plurality of wire nets from longitudinal wires and transverse wires which cross each other at only one side and which points of intersections are welded, said machine comprising, in combination a plurality of welding electrode bridges arranged in the form of a polygon, each of said bridges having electrodes which electrodes work with each other, at least one of said electrodes being movable in a bridge plane between two positions, whereby a closed position is obtained by means of a spaced position of the electrodes which spaced position is relative to the thickness of the net and wherein an open position is obtained by a greater space between the electrodes, guiding means for guiding each of the longitudinal wires in a plane which extends between the electrodes through the latter, driving means for the movable electrode which can be used for bringing said electrode periodically into the closed and thus in the welding position as well as in the open position, displacing means for at least one endless transverse wire which can be used to adjust said transverse wire or all of said longitudinal wires one after the other and to extend said transverse wire in one line per longitudinal wire conduit, the course of said line being in harmony with the straight line in which a central plane of an electrode crosses the plane of the longitudinal wire which is guided through the electrodes forming said central plane, said displacing means having stop members at the angles of the polygon wherein said central plane coincides with the contact surfaces of said stop members, moving means for each of the longitudinal wires and for that part of said longitudinal wires which has already been formed into a finished net, said moving means maintaining constant the said longitudinal wire length at least in the closed position of said electrodes in the ratio in which these electrodes occur, and to move said longitudinal wire length during the other period, for obtaining the formation of meshes and the drawing off of the finished net, means for separating the length of a transverse wire which is already welded together with a longitudinal wire from the further supplied transverse wire, and driving means for said separating means to operate the separating means when the transverse wire length following the separating point is welded together with the respective longitudinal wire conduit, electrical driving means for driving the machine; and pressure-responsive switch means in circuit with said electrical driving means for controlling energization thereof, said switch means being associated with said stop members for maintaining said electrical driving means in operation so long as said transverse wire exerts a pressure on said switch means and for interrupting operation of said driving means upon the cessation of pressure on said switch means whereby in the event of breakage of said transverse wire operation of the machine is stopped.

8. Machine for simultaneously producing a plurality of wire nets from longitudinal wires and transverse wires which cross each other at only one side and which points of intersections are welded, said machine comprising, in combination a plurality of welding electrode bridges arranged in the form of a polygon, each of said bridges having electrodes which electrodes work with each other, at least one of said electrodes being movable in a bridge plane between two positions, whereby a closed position is obtained by means of a spaced position of the electrodes which spaced position is relative to the thickness of the net and wherein an open position is obtained by a greater space between the electrodes, guiding means for guiding each of the longitudinal wires in a plane which extends between the electrodes through the latter, driving means for the movable electrode which can be used for bringing said electrode periodically into the closed and thus in the welding position as well as in the open position, displacing means for at least one endless transverse wire which can be used to adjust said transverse wire or all of said longitudinal wires one after the other and to extend said transverse wire in one line per longitudinal wire conduit, the course of said line being in harmony with the straight line in which a central plane of an electrode crosses the plane of the longitudinal wire which is guided through the electrodes forming said central plane, said displacing means having stop members at the angles of the polygon wherein said central plane coincides with the contact surfaces of said stop members, moving means for each of the longitudinal wires and for that part of said longitudinal wires which has already been formed into a finished net, said moving means maintaining constant the said longitudinal wire length at least in the closed position of said electrodes in the ratio in which these electrodes occur, and to move said longitudinal wire length during the other period, for obtaining the formation of meshes and the drawing off of the finished net, means for separating the length of a transverse wire which is already welded together with a longitudinal wire from the further supplied transverse wire, and driving means for said separating means to operate the separating means when the transverse wire length following the separating point is welded together with the respective longitudinal wire conduit, each of said welding bridges has associated with it a separate actuating mechanism which includes a moving device constituting part of said moving means for moving the respective web in a step-wise manner, an operating device for operating the movable electrode of the respective bridge, and an actuating device for actuating said moving and operating devices.

9. A machine for producing nets of wires as described in claim 8 further comprising clutch means interposed between the actuating device of each actuating mechanism and the respective moving and operating devices, said clutch means being adapted to be operated in a stepwise manner.

10. Machine for producing nets of wires as described in claim 8 further comprising clutch means interposed between the actuating device of each actuating mechanism and the respective moving and operating devices, said clutch means being adapted to be operated in a step-wise manner, further comprising combined stop members and pressure-responsive feeler means arranged at the corners of said polygon for determining the position of said transverse wire with respect to each respective web and for actuating said clutch means in response to pressure exerted by said transverse wire and for de-actuating said clutch means in the absence of such pressure.

11. A machine for producing nets of wires as described in claim 8 further comprising clutch means interposed between the actuating device of each actuating mechanism and the respective moving and operating devices, said clutch means being adapted to be operated in a stepwise manner, further comprising combined stop members and pressure-responsive feeler means arranged at the corners of said polygon for determining the position of said transverse wire with respect to each respective web and for actuating said clutch means in response to pressure exerted by said transverse wire and for deactuating said clutch means in the absence of such pressure, wherein said clutch means are electric clutch means and wherein said pressure-responsive feeler means are electric switch means in circuit with said electric clutch means.

12. Machine for simultaneously producing a plurality of wire nets from longitudinal wires and transverse wires which cross each other at only one side and which points of intersections are welded, said machine comprising, in combination a plurality of welding electrode bridges arranged in the form of a polygon, each of said bridges having electrodes which electrodes work with each other, at least one of said electrodes being movable in a bridge plane between two positions, whereby a closed position is obtained by means of a spaced position of the electrodes which spaced position is relative to the thickness of the net and wherein an open position is obtained by a greater space between the electrodes, guiding means for guiding each of the longitudinal wires in a plane which extends between the electrodes through the latter, driving means for the movable electrode which can be used for bringing said electrode periodically into the closed and thus in the welding position as well as in the open position, displacing means for at least one endless transverse wire which can be used to adjust said transverse wire or all of said longitudinal wires one after the other and to extend said transverse wire in one line per longitudinal wire conduit, the course of said line being in harmony with the straight line in which a central plane of an electrode crosses the plane of the longitudinal wire which is guided through the electrodes forming said central plane, said displacing means having stop members at the angles of the polygon wherein said central plane coincides with the contact surfaces of said stop members, moving means for each of the longitudinal wires and for that part of said longitudinal wires which has already been formed into a finished net, said moving means maintaining constant the said longitudinal wire length at least in the closed position of said electrodes in the ratio in which these electrodes occur, and to move said longitudinal wire length during the other period, for obtaining the formation of meshes and the drawing off of the finished net, means for separating the length of a transverse wire which is already welded together with a longitudinal wire from the further supplied transverse wire, and driving means for said separating means to operate the separating means when the transverse wire length following the separating point is welded together with the respective longitudinal wire conduit, said separating means include cutting means arranged at the corners of said polygon and mounted upon said movable electrodes for movement therewith.

13. Machine for simultaneously producing a plurality of wire nets from longitudinal wires and transverse wires which cross each other at only one side and which points of intersections are welded, said machine comprising, in combination a plurality of welding electrode bridges arranged in the form of a polygon, each of said bridges having electrodes which electrodes work with each other, at least one of said electrodes being movable in a bridge plane between two positions, whereby a closed position is obtained by means of a spaced position of the electrodes which spaced position is relative to the thickness of the net and wherein an open position is obtained by a greater space between the electrodes, guiding means for guiding each of the longitudinal wires in a plane which extends between the electrodes through the latter, driving means for the movable electrode which can be used for bringing said electrode periodically into the closed and thus in the welding position as well as in the open position, displacing means for at least one endless transverse wire which can be used to adjust said transverse wire or all of said longitudinal wires one after the other and to extend said transverse wire in one line per longitudinal wire conduit, the course of said line being in harmony with the straight line in which a central plane of an electrode crosses the plane of the longitudinal wire which is guided through the electrodes forming said central plane, said displacing means having stop members at the angles of the polygon wherein said central plane coincides with the contact surfaces of said stop members, moving means for each of the longitudinal wires and for that part of said longitudinal wires which has already been formed into a finished net, said moving means maintaining constant the said longitudinal wire length at least in the closed position of said electrodes in the ratio in which these electrodes occur, and to move said longitudinal wire length during the other period, for obtaining the formation of meshes and the drawing off of the finished net, means for separating the length of a transverse wire which is already welded together with a longitudinal wire from the further supplied transverse wire, and driving means for said separating means to operate the separating means when the transverse wire length following the separating point is welded together with the respective longitudinal wire conduit, and trimming means for cutting off ends of said transverse wire which project beyond the outermost longitudinal wires.

14. A machine for producing nets of wires as described in claim 10, wherein said combined stop member and pressure-responsive feeler means are formed with abutment surfaces which are so oriented that a line joining the abutment surfaces of two combined stop member and pressure-responsive feeler means located at successive corners of said polygon lies in the plane in which the movable electrode of the corresponding welding bridge moves.

15. Machine for simultaneously producing a plurality of wire nets from longitudinal wires and transverse wires which cross each other at only one side and which points of intersections are welded, said machine comprising, in combination a plurality of welding electrode bridges arranged in the form of a polygon, each of said bridges having electrodes which electrodes work with each other, at least one of said electrodes being movable in a bridge plane between two positions, whereby a closed position is obtained by means of a spaced position of the electrodes which spaced position is relative to the thickness of the net and wherein an open position is obtained by a greater space between the electrodes, guiding means for guiding each of the longitudinal wires in a plane which extends between the electrodes through the latter, driving means for the movable electrode which can be used for bringing said electrode periodically into the closed and thus in the welding position as well as in the open position, displacing means for at least one endless transverse wire which can be used to adjust said transverse wire or all of said longitudinal wires one after the other and to extend said transverse wire in one line per longitudinal wire conduit, the course of said line being in harmony with the straight line in which a central plane of an electrode crosses the plane of the longitudinal wire which is guided through the electrodes forming said central plane, said displacing means having stop members at the angles of the polygon wherein said central plane coincides with the contact surfaces of said stop members, moving means for each of the longitudinal wires and for that part of said longitudinal wires which has already been formed into a finished net, said moving means maintaining constant the said longitudinal wire length at least in the closed position of said electrodes in the ratio in which these electrodes occur, and to move said longitudinal wire length during the other period, for obtaining the formation of meshes and the drawing off of the finished net, means for separating the length of a transverse wire which is already welded together with a longitudinal wire from the further supplied transverse wire, and driving means for said separating means to operate the separating means when the transverse wire length following the separating point is welded together with the respective longitudinal wire conduit, said separating means include cutting means arranged at the corners of said polygon and mounted upon said movable electrodes for movement therewith, wherein trimming means are provided for cutting off ends of said transverse wire which project beyond the outermost longitudinal wires; and wherein each of said welding bridges has associated with it a separate actuating mechanism which includes a moving device constituting part of said moving means for moving the respective web in a step-wise manner, an operating device for operating the movable electrode of the respective bridge, an actuating device for actuating said moving and operating devices, and clutch means interposed between each actuating device and the respective moving and operating devices, said clutch means being adapted to be operated in a step-wise manner.

16. Machine for simultaneously producing a plurality of wire nets from longitudinal wires and transverse wires which cross each other at only one side and which points of intersections are welded, said machine comprising, in combination a plurality of welding electrode bridges arranged in the form of a polygon, each of said bridges having electrodes which electrodes work with each other, at least one of said electrodes being movable in a bridge plane between two positions, whereby a closed position is obtained by means of a spaced position of the electrodes which spaced position is relative to the thickness of the net and wherein an open position is obtained by a greater space between the electrodes, guiding means for guiding each of the longitudinal wires in a plane which extends between the electrodes through the latter, driving means for the movable electrode which can be used for bringing said electrode periodically into the closed and thus in the welding position as well as in the open position, displacing means for at least one endless transverse wire which can be used to adjust said transverse wire or all of said longitudinal wires one after the other and to extend said transverse wire in one line per longitudinal wire conduit, the course of said line being in harmony with the straight line in which a central plane of an electrode crosses the plane of the longitudinal wire which is guided through the electrodes forming said central plane, said displacing means having stop members at the angles of the polygon wherein said central plane coincides with the contact surfaces of said stop members, moving means for each of the longitudinal wires and for that part of said longitudinal wires which has already been formed into a finished net, said moving means maintaining constant the said longitudinal wire length at least in the closed position of said electrodes in the ratio in which these electrodes occur, and to move said longitudinal wire length during the other period, for obtaining the formation of meshes and the drawing off of the finished net, means for separating the length of a transverse wire which is already welded together with a longitudinal wire from the further supplied transverse wire, and driving means for said separating means to operate the separating means when the transverse wire length following the separating point is welded together with the respective longitudinal wire conduit, and applying means for laying at least one continuous transverse wire successively upon all of said plurality of longitudinal wires in such a manner that said transverse wire is laid onto each individual longitudinal wire along a line which coincides with the respective side of said polygon.

References Cited in the file of this patent

UNITED STATES PATENTS

| | | |
|---|---|---|
| 633,214 | Perry | Sept. 19, 1899 |
| 1,198,349 | Heany | Sept. 12, 1936 |
| 1,945,890 | Gaskell | Feb. 6, 1934 |
| 2,772,701 | Brune | Dec. 4, 1956 |

FOREIGN PATENTS

| | | |
|---|---|---|
| 626,625 | Germany | Feb. 29, 1936 |